(12) United States Patent
Hegemann et al.

(10) Patent No.: US 6,749,822 B2
(45) Date of Patent: Jun. 15, 2004

(54) PROCESS FOR TREATMENT OF GASES FROM A SINTERING PLANT

(75) Inventors: Karl-Rudolf Hegemann, Essen (DE); Helmut Weissert, Bochum (DE)

(73) Assignee: Paul Wurth S.A., Luxembourg (LU)

( * ) Notice: Subject to any disclaimer, the term of this patent is extended or adjusted under 35 U.S.C. 154(b) by 157 days.

(21) Appl. No.: 10/090,018

(22) Filed: Feb. 28, 2002

(65) Prior Publication Data

US 2002/0119067 A1 Aug. 29, 2002

Related U.S. Application Data

(63) Continuation of application No. PCT/EP00/08950, filed on Sep. 13, 1999.
(51) Int. Cl.$^7$ .................................................. B01J 8/00
(52) U.S. Cl. ..................................... 423/245.3; 423/247
(58) Field of Search ........................... 423/245.3, 245.1, 423/246, 247

(56) References Cited

U.S. PATENT DOCUMENTS 5,490,977 A * 2/1996 Wan et al. ................... 423/210

FOREIGN PATENT DOCUMENTS

| BE | 1008097 A6 | 1/1996 |
| DE | 44 31 939 | 1/1996 |
| EP | 0 567 964 | 11/1993 |
| EP | 0 895 049 | 2/1999 |
| EP | 0 908 222 | 4/1999 |
| JP | 60039130 | 2/1985 |

* cited by examiner

Primary Examiner—Stanley S. Silverman
Assistant Examiner—Edward M. Johnson
(74) Attorney, Agent, or Firm—Nath & Associates PLLC; Gary M. Nath; Todd L. Juneau

(57) ABSTRACT

Process for treatment of gases which are exhausted through a sinter bed in a sintering plant, wherein a distinction can be made between a cold zone of the sintering plant with relatively low gas temperatures and a hot zone of the sintering plant with substantially higher gas temperatures. The gases from the cold zone of the sintering plant and the gases from the hot zone of the sintering plant are exhausted and treated as separate partial flows.

11 Claims, 4 Drawing Sheets

PROCESS FOR TREATMENT OF GASES FROM A SINTERING PLANT

This is a continuation of International Application No. PCT/EP00/08950 filed Sep. 13, 2000.

The invention relates to a process for exhaustion and treatment of gases from a sintering plant.

Making fine ores lumpy for use in blast furnaces is called sintering or agglomeration. In a conventional sintering plant a sinter mixture, i.e. a fine ore mixture and a fuel, is placed on a sintering belt, i.e. a conveyor belt designed as a grating. The sintering belt with the mixture, also called a sintering bed, passes over a large number of suction boxes. Air is drawn through the sintering bed via these suction boxes. An ignition furnace located above the first suction box ignites the sinter mix. The combustion spreads from the top downwards through the sintering bed during passage over the other suction boxes. During combustion the admixed fuel produces a temperature which is just sufficient to soften the fine ore at its surface, so that the fine ore mixture agglomerates to form a sinter cake. The combustion gases produced during sintering are exhausted with the combustion air via the suction boxes. The sintering plants are usually equipped in such a way that the suction boxes are connected via an electrostatic filter (in some cases also a fabric filter) to a fan, which generates the required negative pressure under the sintering belt to draw the required combustion air through the sintering bed. The cleaned gas mixture is then discharged by the fan into the atmosphere via a chimney stack.

Many of the sintering plants currently in operation exhibit major environmental problems. The gas mixture exhausted under the sintering belt has in fact a high dust and pollutant content. The gas mixture discharged from the chimney stack normally has dioxin contents of about 3–7 ng per $m^3$ N.T.P. In addition, relatively high dust concentrations of more than 100 $mg/m^3$ N.T.P. in older plants and less than 50 $mg/m^3$ N.T.P. in more modern plants are achieved when electrostatic filters are used because of the unfavorable dust behavior in sintering plants.

Various methods have so far been used to solve the dioxin problem.

For example, a catalyzer which has already proved effective in refuse incinerators for dioxin separation has been used behind the electrostatic filter. In the refuse incinerators this catalyzer destroys the dioxin without residues. However, it has emerged during operation of such a catalyzer in a sintering plant that the dioxin destruction in the catalyzer is often disturbed and sometimes does not even take place at all. This is attributable in particular to the low gas temperatures (sometimes below 100° C.).

In another process activated charcoal or hearth-furnace coke together with calcium hydroxide is injected into the waste gas flow behind the electrostatic filter. The activated charcoal bonds the dioxin, the calcium hydroxide is required to render the process inert. Because of the high reactivity of the activated charcoal/hearth-furnace coke there is otherwise a fire hazard. Behind the injection section there is a fabric filter, in which the injected substances contaminated with dioxin are separated again and the generally still quite high dust concentrations behind the electrostatic filter are further reduced significantly. Distribution of the activated charcoal/hearth-furnace coke proves to be problematical, because in the areas of overdosing there is a greater fire hazard and in areas of low concentration adequate dioxin separation is not achieved. Furthermore, a product heavily contaminated with dioxin, which must be further processed (e.g. by recycling to the sintering plant), is formed in the filter. A large proportion of the filter dust is returned to the injection point in order to use the activated charcoal/hearth-furnace coke repeatedly. Only a small partial flow is discharged and returned e.g. to the sintering plant.

According to a further process activated charcoal/hearth-furnace coke is injected directly into the electrostatic filter. However, there is considerable doubt as to whether the required dioxin separation can be achieved with this measure and whether the electrostatic filter allows larger quantities of dust to pass through as a result of the additional dust load. In addition substantially higher quantities of activated charcoal/hearth-furnace coke are required than in the preceding process. There is also the problem of disposal of the electrostatic filter material.

Consequently the task of the invention is to propose a process with which the waste gas problem of a sintering plant can be solved more effectively, easily and economically.

According to the invention this problem is solved by a process according to claim 1.

In a sintering plant the temperature in the sintering bed is relatively low from the ignition area to the center of the plant. The temperature rises clearly in the sintering bed only beyond the center of the plant. Hence it is possible to distinguish between a cold and a hot zone in the sintering plant. According to the invention a more effective, simpler and economical treatment of the waste gases of the sintering plant is achieved by exhausting and treating the gases from the cold zone and hot zone of the sintering plant as separate partial flows instead of exhausting and treating them as a total flow as in the past. Dioxin measurements on existing sintering plants have in fact revealed that only very small dioxin quantities are produced in the cold zone. Hence the partial flow exhausted separately from the cold zone is only very slightly contaminated by dioxin and does not require treatment for reduction of the dioxin content. Larger quantities of dioxin are released only in the waste gases from the hot zone and exhausted with the partial flow from the hot zone. If this second partial flow is to undergo treatment to reduce the dioxin content, it should be stated that as a result of separation of the partial flow from the cold zone the temperature of the partial flow from the hot zone does, of course, exceed the mixing temperature of the total flow, which has a positive effect, for example, on the efficiency of dioxin separation in the catalyzer. Hence it can be concluded that the waste gas problem of the sintering plant is generally simplified by the separate exhaustion of the gases from the cold and hot zone. A more specific and thus more effective gas treatment can take place, economic advantages likewise being achieved by the smaller gas quantities in the partial flows.

The partial flow from the cold zone of the sintering plant advantageously undergoes only dust removal treatment. As only very small dioxin quantities are present in the partial flow originating from the cold zone, it is unnecessary, for example, to subject this partial flow to treatment for reduction of the dioxin content.

Dust is preferably removed from the partial flow from the cold zone of the sintering plant in one or more electrostatic filters. The dust separation in electrostatic filters can be clearly improved by a higher H2O concentration in the cold zone, the lower waste gas temperature and a far smaller gas quantity.

The partial flow from the hot zone of the sintering plant advantageously first undergoes dust removal and is subsequently treated to reduce the dioxin content. Dust is preferably removed from the partial flow from the hot zone of the sintering plant in a fabric filter or cloth filter, which is particularly effective in the case of fine dusts in relatively dry gas mixtures.

The dioxin content is preferably reduced in a catalyzer. A catalyzer which permits extremely good dioxin separation in refuse incinerators, for example, can be used. Only the partial flow from the hot zone of the sintering plant, in which substantial dioxin quantities are released, is collected and fed to the catalyzer. As the partial flow treated in the catalyzer has an adequately high temperature, the dioxin is destroyed without residues in the catalyzer.

The partial flow from the hot zone of the sintering plant may be additionally heated in front of the catalyzer. The additional heating can advantageously take place e.g. by combustion of the CO gas present in this partial flow, preferably in a CO catalyzer. Consequently an even higher gas temperature is achieved, which further improves the dioxin separation in the catalyzer.

The partial flow from the hot zone of the sintering plant is preferably additionally subjected to treatment for reduction of the NOx content. This treatment for reduction of the NOx content advantageously comprises injection of NH3 into the partial flow from the hot zone of the sintering plant. At the temperatures of the partial flow from the hot zone NOx reacts well with NH3.

The partial flow from the hot zone preferably has a mixing temperature of over 200° C. and the partial flow from the cold zone a mixing temperature of less than 100° C. In fact, at temperatures of over 200° C. the catalyzer should be capable of destroying the dioxin without residues and at temperatures of less than 100° C. the dioxin content in the waste gas of the sintering plant should be negligible.

The dioxin content in the partial flow from the cold zone is preferably less than 0.5 ng/m$^3$ N.T.P.

Under standard conditions (P=1 bar, T=273.15 K) the two partial flows are preferably of approximately the same size.

An embodiment of the invention will now be described with reference to the enclosed figures.

Figure 1:
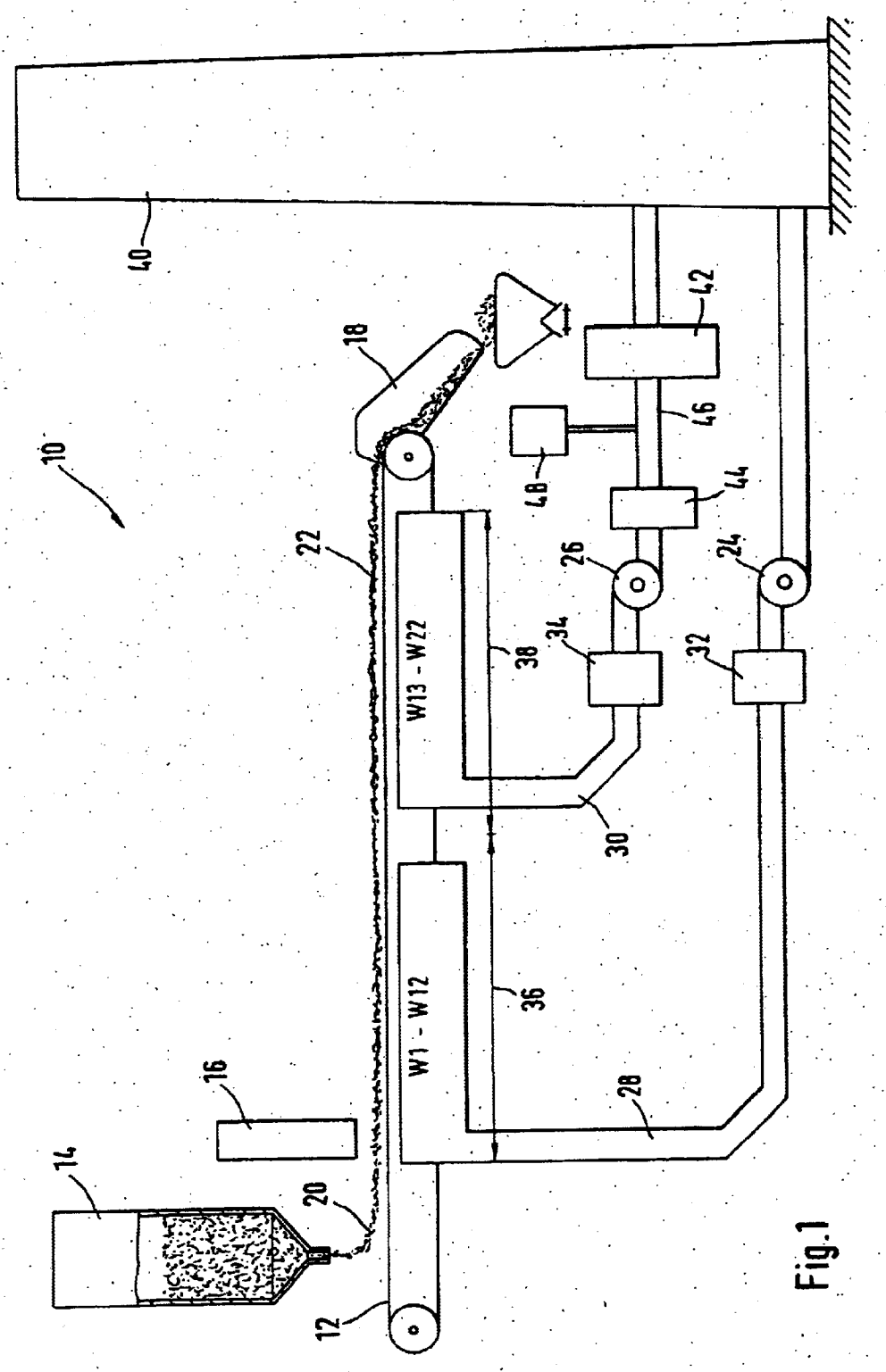
FIG. 1 is a schematic side view of a sintering plant.

FIG. 1 shows a sintering plant 10 with a sintering belt 12, a bunker 14, an ignition furnace 16, a discharge point 18 and several suction boxes W1–W22. A sinter mixture 20, i.e. a fine ore mixture and a fuel, is fed from the bunker 14 onto the sintering belt 12, i.e. a conveyor belt designed as a grating. The sintering belt 12 conveys the charged sintering mixture 20, also called the sinter bed, over the suction boxes W1–W22 to the discharge point 18. Air is drawn through the sinter bed via these suction boxes W1–W22. The ignition furnace 16, which is located above the first suction box W1, ignites the sinter mixture 20. The combustion spreads slowly from the top downwards through the entire sinter layer during passage over the further suction boxes W2–W22. During combustion the admixed fuel produces a temperature which is just adequate to soften the fine ore at its surface, so that the sinter mixture agglomerates to form a sinter cake 22. The combustion gases produced during sintering are exhausted with the combustion air via the suction boxes W1–W22.

Figure 2:
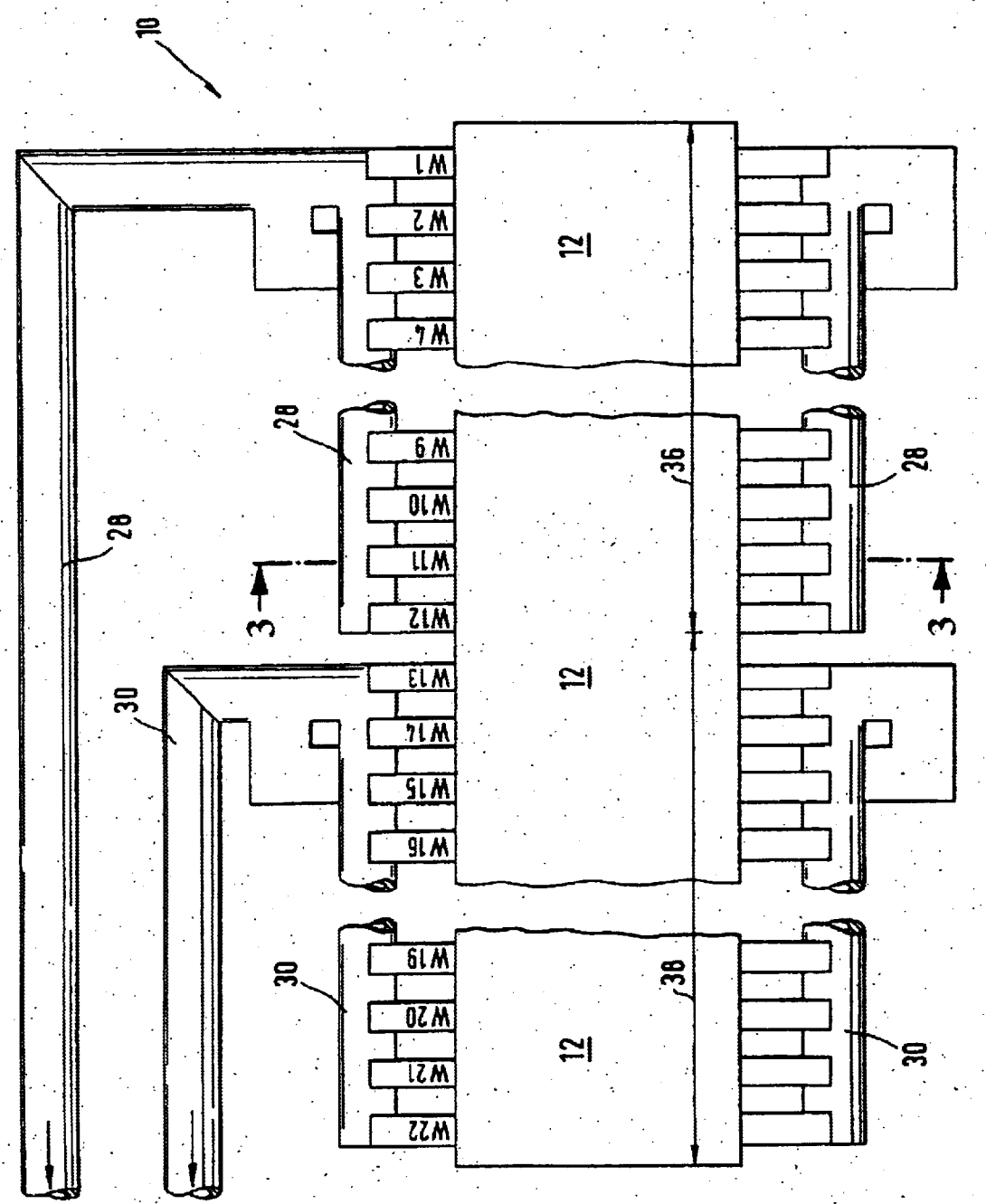
FIG. 2 is a schematic plan view of a sintering plant.
Figure 3:
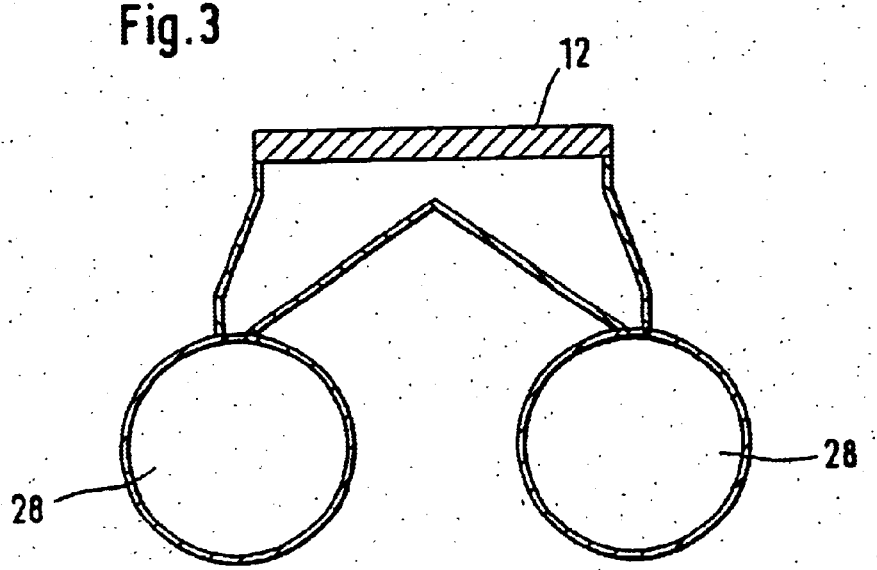
FIG. 3 is a section A—A through the sintering plant shown in FIG. 2.

In the embodiment of a sintering plant 10 shown in FIG. 1 and FIG. 2 the waste gases are exhausted and treated as two separate partial flows according to the invention. The suction boxes W1–W22 are divided into two separate groups for this purpose. A first group comprises the suction boxes W1–W12, which are assigned to a so-called cold zone 36 of the sintering plant. A second group comprises the suction boxes W13–W22, which are assigned to a so-called hot zone 38 of the sintering plant.

Figure 4:
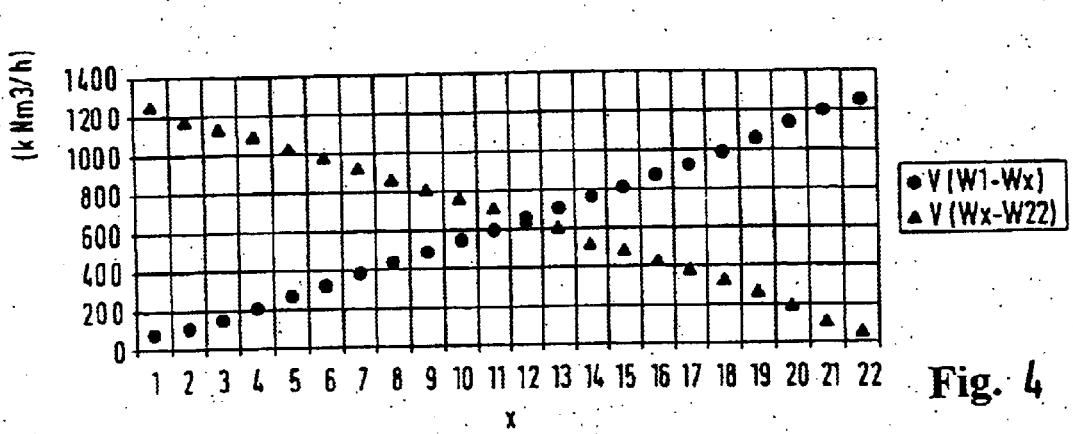
FIG. 4 is a graph of the volumetric flow of the waste gases of both zones.
Figure 5:
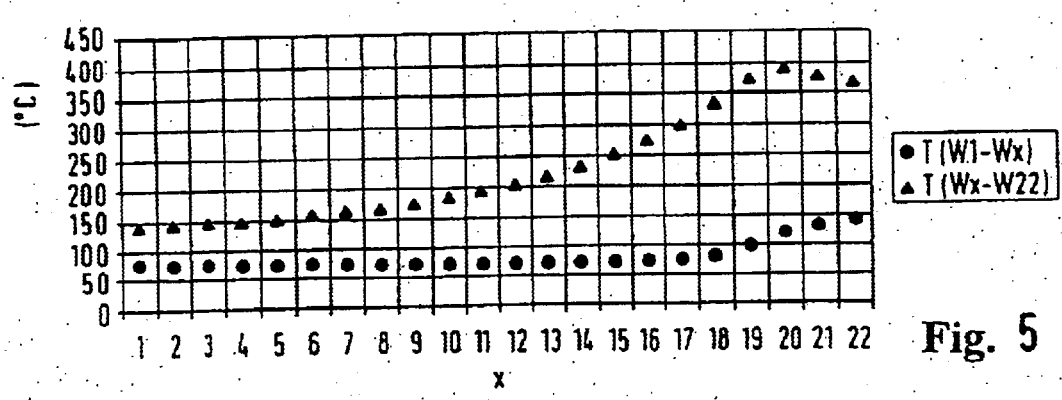
FIG. 5 is a graph of the temperature of the waste gases of both zones.
Figure 6:
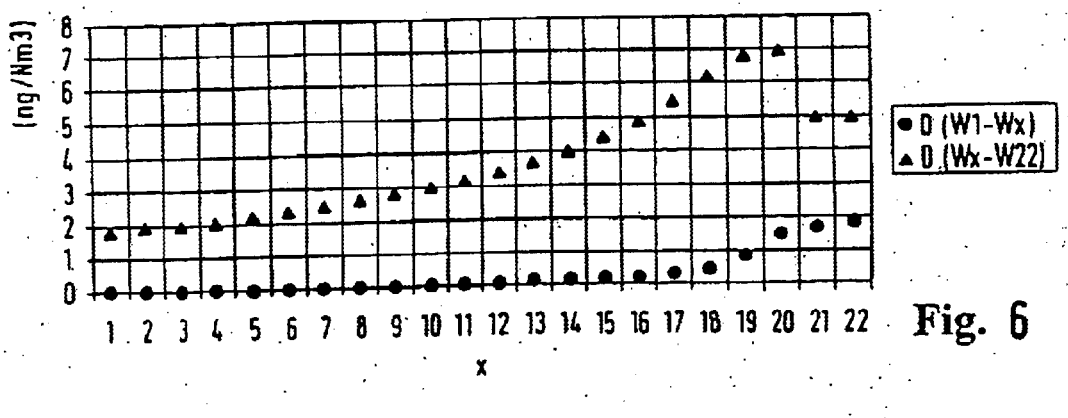
FIG. 6 is a graph of the dioxin content of the waste gases of both zones.

FIGS. 4–6 show the mean values of the size (volumetric flow), temperature and dioxin content for the two partial flows for different distributions of the suction boxes W1–W22 between the two groups. The values for the partial flow from the first group are represented by dots and entered under the ordinal number x of the last suction box of the first group in each case. The values for the partial flow from the second group are represented by triangles and are entered under the ordinal number x of the suction box in the second group in each case.

EXAMPLE

If the suction boxes are distributed between a first group, W1–W12 and a second group W13–W22, the values for the partial flow from the first group are indicated above the abscissa 12 with a dot and the values for the partial flow from the second group above the abscissa 13 by a triangle. FIG. 4 shows the size of the two partial flows in km$^3$/h N.T.P., i.e. under standard conditions. It can be seen that with a separation between the suction boxes W12 and W13 the two partial flows are approximately the same size. In other words, the partial flow from the cold zone and the partial flow from the hot zone are essentially the same size under standard conditions at the aforementioned limit between the cold and hot zone.

FIG. 5 shows the temperature of the two partial flows in ° C. It can be seen that with a separation between the suction boxes W12 and W13, the temperature of the partial flow from the cold zone is 73° C. (see abscissa 12), whereas the temperature of the partial flow from the hot zone is 220° C. (see abscissa 13), i.e. significantly higher. If the waste gases are not separated into two partial flows, as in the plants so far known, the temperature of the total flow is about 140° C. (see abscissa 1 or 22). With separation between the suction boxes W12 and W13 the temperature of the partial flow from the hot zone is consequently about 80° C. higher.

FIG. 6 shows the dioxin content of the two partial flows in ng referred to one m$^3$ N.T.P. gas. It can be seen that with a separation between the suction boxes W12 and W13 the dioxin content of the partial flow from the cold zone is 0.10 ng/m$^3$ N.T.P. (see abscissa 12), whereas the dioxin content of the partial flow from the hot zone is 3.74 ng/m$^3$ N.T.P. (see abscissa 13), i.e. significantly higher. In other words the dioxin content in the partial flow from the cold zone is negligible and does not constitute an environmental problem.

The suction boxes W1–W12 are connected by a suction line 28 to a fan 24, which removes the partial flow from the cold zone 36. In front of the fan 24 there is an electrostatic filter 32, which removes dust from the partial flow from the cold zone. The latter is subsequently discharged via a chimney stack 40 into the atmosphere. The partial flow from the cold zone 36 has a minimum dioxin content (0.10 ng/m$^3$ N.T.P.), so that treatment to reduce the dioxin content is unnecessary.

The suction boxes W13–W22 are connected by a suction pipe 30 to a separate fan 26, which removes the partial flow from the hot zone 38. In front of the fan 26 there is a fabric filter 34, which removes the dust from the partial flow from the hot zone 38. As the partial flow from the hot zone 38 has a relatively high dioxin content (3.74 ng/m$^3$ N.T.P.), this partial flow must be subjected to treatment for reduction of the dioxin content in a catalyzer 42. The high temperature of the waste gases originating from the hot zone 38 (mean value of the temperature: 220° C.) permits a very good residue-free dioxin separation in the catalyzer 42. The partial flow from the hot zone 38 can now be discharged into the atmosphere via the chimney stack 40.

The dioxin separation in the catalyzer 42 can be further improved by additional heating of the partial flow from the hot zone 38. For this purpose the CO gas present in the partial flow is burnt e.g. in a preceding CO catalyzer 44.

In addition to the dioxin separation NOx separation can take place at the same time. For this purpose NH3 48 is injected into the partial flow from the hot zone 38 in a duct 46 in front of the catalyzer 42. At the high temperatures of this partial flow NOx reacts exceptionally well with NH3.

As the gases from the cold zone 36 of the sintering plant and the gases from the hot zone 38 of the sintering plant are exhausted and treated as separate partial flows, both the dust as well as the dioxin and NOx emissions of the plant can be significantly reduced at low cost, economically and with excellent efficiency.

What is claimed is:

1. A process for treatment of gases that are exhausted through a sinter bed in a sintering plant, wherein a distinction can be made between a cold zone of the sintering plant with relatively low gas temperatures and a hot zone of said sintering plant with substantially higher gas temperatures, said process comprising the steps of:

separately exhausting said gases from said cold zone and from said hot zone, so as to obtain a partial flow from said cold zone and a partial flow from said hot zone;

subjecting said partial flow from said cold zone and said partial flow from said hot zone to a separate treatment;

wherein the treatment of said partial flow from said hot zone includes:

heating said partial flow from said hot zone in a CO-catalyzer by burning CO gas contained therein; and subsequently treating said partial flow from said hot zone in a catalyzer for reducing hydrocarbons, in particular dioxins and furanes, contained therein.

2. The process according to claim 1, wherein said treatment of said partial flow from said cold zone of said sintering plant consists of a dust removal treatment.

3. The process according to claim 2, wherein said dust removal treatment of said partial flow from said cold zone takes place in one or more electric or filtering separators.

4. The process according to claim 3, wherein said dust removal treatment of said partial flow from said hot zone takes place in one or more electric or filtering separators.

5. The process according to claim 2, wherein said partial flow from said hot zone of said sintering plant first undergoes a dust removal treatment before it is introduced into said CO-catalyzer.

6. The process according to claim 1, wherein said partial flow from said hot zone of said sintering plant is additionally subjected to a NOx reducing treatment.

7. The process according to claim 6, wherein said NOx reducing treatment comprises injection of NH3 into said partial flow from said hot zone of said sintering plant.

8. The process according to claim 1, wherein said partial flow from said hot zone of said sintering plant has a mixing temperature of more than 180° C. and said partial flow from said cold zone a mixing temperature of less than 100° C.

9. The process according to claim 1, wherein the dioxin and furan content in the partial flow from the cold zone is less than 0.5 ng/m3 N.T.P.

10. The process according to claim 1, wherein the two partial flows are approximately the same size under standard conditions.

11. The process according to claim 1, wherein said partial flow from said hot zone is exhausted by a fan through an electric or filtering separator, said fan being arranged upstream of said CO-catalyzer.

* * * * *

UNITED STATES PATENT AND TRADEMARK OFFICE
CERTIFICATE OF CORRECTION

PATENT NO. : 6,749,822 B2
DATED : June 15, 2004
INVENTOR(S) : Hegemann et al.

It is certified that error appears in the above-identified patent and that said Letters Patent is hereby corrected as shown below:

Title page,
Item [63], Related U.S. Application Data, replace "September 13, 1999" with -- September 13, 2000 --.

Signed and Sealed this

Twenty-third Day of August, 2005

JON W. DUDAS
*Director of the United States Patent and Trademark Office*